FIG. I

INVENTORS
EDGAR A. BROWN
EUGENE A. SANDS
BY
Fidler, Crouse & Beardsley
ATTORNEY

May 5, 1959 E. A. BROWN ET AL 2,885,148

BINARY ACCUMULATOR

Filed Oct. 7, 1952 2 Sheets-Sheet 2

INVENTORS
EDGAR A. BROWN
EUGENE A. SANDS
BY
Fidler, Crouse & Beardsley
ATTORNEY 2,885,148
Patented May 5, 1959

2,885,148

BINARY ACCUMULATOR

Edgar Alan Brown, Vestal, and Eugene Arthur Sands, Mount Kisco, N.Y., assignors to Burroughs Corporation, a corporation of Michigan Application October 7, 1952, Serial No. 313,522

15 Claims. (Cl. 235—164)

Figure 1:
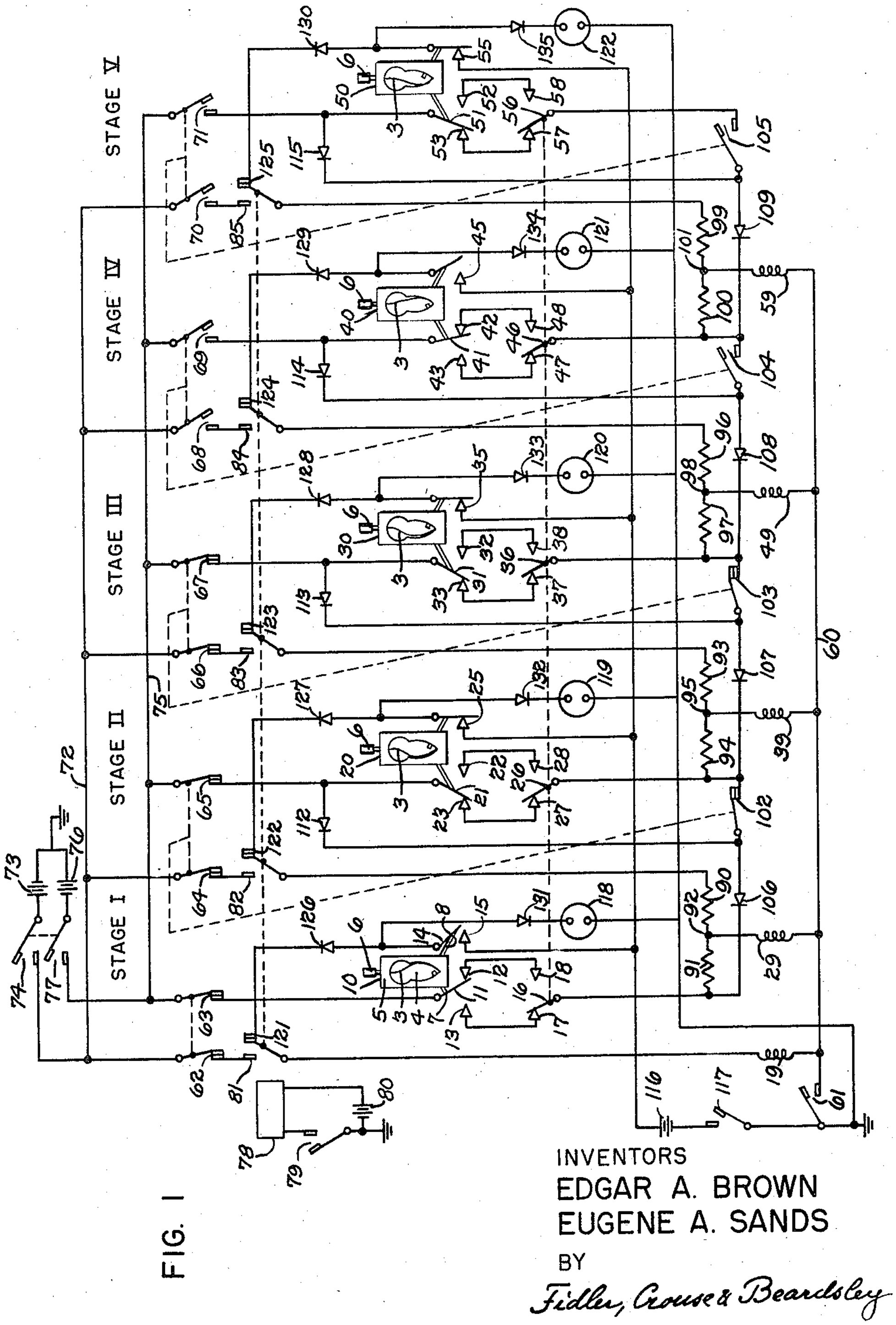

The present invention relates generally to computing devices, and more particularly to devices for accumulating numbers in the binary code and for storing the results of such accumulations.

It has heretofore been proposed to use bi-stable mechanical or electromagnetic devices or electronic circuits for responding to binary information in apparatus for accumulating binary numbers. Mechanical devices have the advantage of being accurate and reliable, but, generally speaking, are relatively slow as compared with electrical devices. Furthermore, heretofore when mechanical devices were used in accumulators, some means had to be provided for effecting the required "carry" or "borrow" after the addition or subtraction operation had been partially completed which would reduce the operational speed of the accumulators still further to a point where they were too slow to be used with present day high speed equipments. Bi-stable devices of the electromagnetic type, such as relays, have the desired operational speed but require a large number of contacts, usually from 20 to 36 contacts per binary stage, in order correctly to take into account borrows and carries. Bi-stable electronic circuits have the advantage of having a very rapid response but are, of course, subject to the various drawbacks common to electronic circuits such as being of a rather delicate nature rendering them unsuitable for use in equipments exposed to rough usage, and being expensive to manufacture and to maintain. Another disadvantage of using bi-stable electromagnetic devices or electronic circuits in binary accumulators is that they require continuous application of electric power in order to retain or store the information accumulated therein.

One object of the present invention is to provide a novel device for accumulating binary information, which has none of the above noted disadvantages of prior art accumulators.

Another object is to provide a novel binary accumulator having a small number of contacts per binary stage and in which carries and borrows are automatically transferred from one stage to another as required so that all the stages of the accumulator may be operated upon simultaneously in an adding or a subtracting operation.

Another object is to provide a novel and simple binary accumulator having a power "off" storage or memory of information accumulated therein.

Another object is to provide a simple, inexpensive and sturdy binary accumulator utilizing bi-stable mechanical devices actuated by electromagnetic means and having a very high operational speed.

Another object is to provide a novel and simple binary accumulating circuit for utilizing bi-stable mechanical devices capable of accepting new information without destroying the old information.

Another object is to provide a simple, sturdy and inexpensive binary multi-stage accumulator circuit including electromagnetic means for operating bi-stable mechanical devices, interconnected in a half-adder circuit which is energized by either a binary digit "1" to be accumulated or a carry, or a borrow depending on whether it is an addition or a subtraction operation, transferred from another stage, but not energized when both or neither is present.

Another object is to provide a novel and simple multi-stage accumulator circuit utilizing bi-stable mechanical devices actuated by electromagnetic means for performing parallel adding and subtracting operations in the binary number system, and including means for automatically taking into account carries or borrows to provide a correct result.

A more specific object of the invention is to provide a calculator particularly adapted for accumulating binary numbers, which comprises an electrical circuit divided into a number of stages of which each includes a mechanical bi-stable device capable of accepting new information while retaining the old information, means for operating each bi-stable device under the combined control of an electrical circuit connection established in response to the register for entering the new information to that stage and an electrical circuit connection established as required when there is a carry to or a borrow from another stage.

More specific objects of the invention include the provisions in a calculator in accordance with the preceding objects of simple means for selectively conditioning the computer for adding or subtracting operation, simple circuit means for transmitting both the carry and the borrow signal whether propagated or initiated, means for readily obtaining a visual indication of a subtotal, means for readily zeroizing or clearing the circuit, and means for providing an end-around connection.

Figure 2:
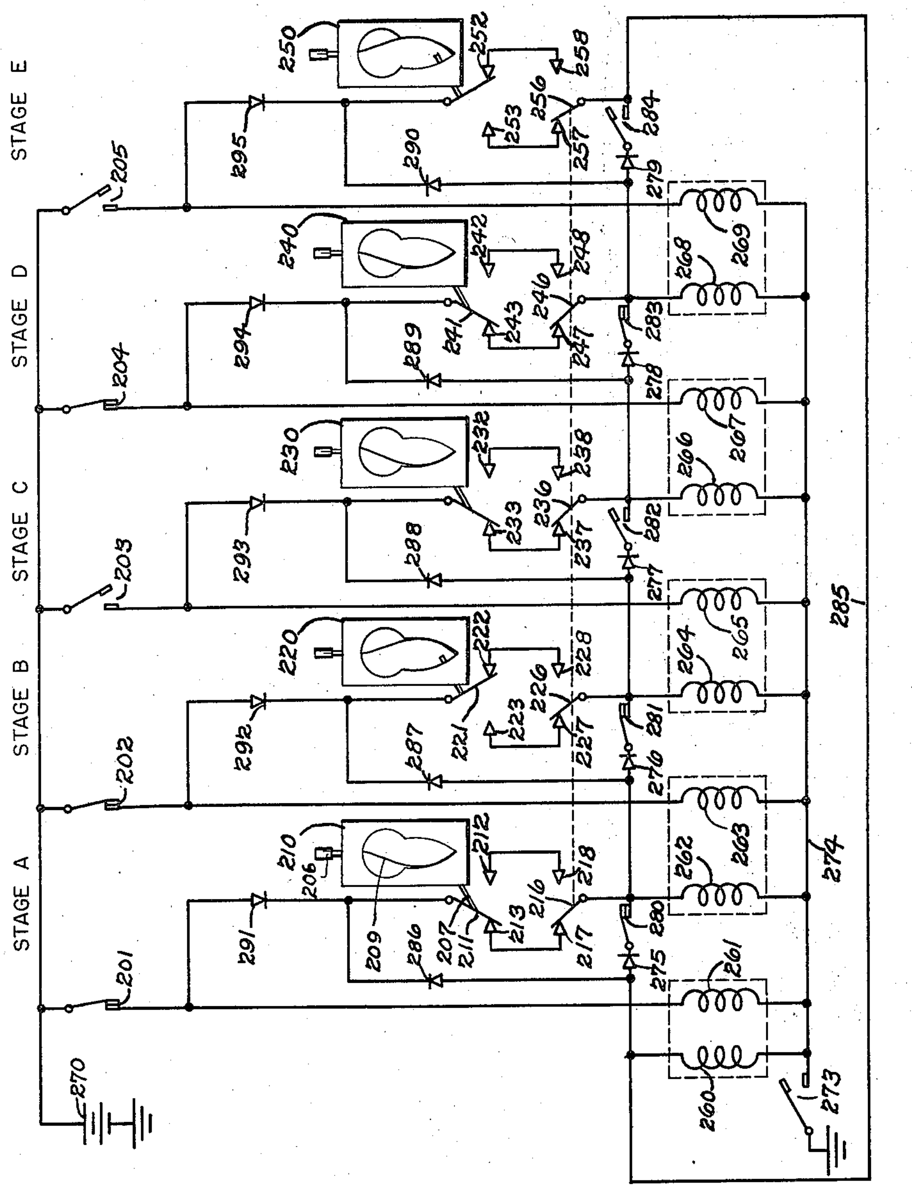

Other objects and advantages of the invention will appear from the following description taken together with the accompanying drawings in which, Fig. 1 is a schematic circuit diagram of one embodiment of the invention including means for zeroizing and/or reading, and Fig. 2 is a schematic circuit diagram of a second embodiment having an end-around circuit connection.

In the embodiment illustrated in Fig. 1 there is shown for the purpose of illustration a five-stage binary accumulator utilizing mechanical bi-stable devices 10, 20, 30, 40 and 50 in stages I, II, III, IV and V, respectively.

Various types of bi-stable devices whether they be mechanical, electromagnetic or electronic may be used to advantage in the circuit illustrated as long as they are capable of performing the function of the bi-stable device illustrated, that is, capable of accepting new information while retaining an indication of the old information. The mechanical bi-stable devices illustrated herein are of the type disclosed and claimed in United States patent application Serial No. 227,924, filed May 23, 1951, by A. E. Brown, co-inventor of the present invention, now U.S. Patent No. 2,658,972, issued November 10, 1953. As more fully described in the patent application mentioned, the bi-stable device may comprise a flexible member such as a spring member 3 which has a stable position to the right as shown in device 10, of stage I for example, or to the left as shown in device 20, of stage II. The spring is confined within an opening 4 in the housing 5 so that one end of the spring rests in the V-shaped bottom of the opening while the other end of the spring is clamped within the end of a spring actuating member 6. Member 6 has a limited movement from the position shown wherein spring 3 will be slightly deformed, to a position inwardly wherein the spring will be distorted to a point where it will assume the opposite position after the spring actuating member is again released. Each device is provided with a plunger 7 normally biased inwardly into the opening 4 when spring 3 is in its stable position to the right, and forced outwardly by the spring when the spring is in the position to the left as shown in device 20. If it is desired to include the zeroizing and the read-out feature to be described herein, a second plunger 8 is provided on the opposite side of plunger 7 of each of the devices. Plunger 8 is also normally biased inwardly and will assume a retracted position as shown in device 20 when the spring is in its stable position to the left, but it will be forced to its extended position shown in device 10 when the spring is in its stable position to the right.

It was pointed out in the above-identified application that if spring actuating member 6 is moved inwardly, spring 3 will be distorted into an S-shape wherein the downwardly extending bulge of the S will contact the left-hand side of the opening 4 when the spring is initially in the position shown in device 10, but the lower end of the spring will remain against at least a portion of the right-hand side of the opening to maintain plunger 8 in extended position and will not engage plunger 7. The spring will remain in this position as long as spring actuating member is kept depressed but will immediately flip over to the position shown in device 20 when the plunger is released. The reverse action will take place if the spring is initially in the position to the left as shown in device 20. It will be evident that successive applications of force pulses to spring actuating member 6 will cause spring 3 successively to assume its alternate stable positions. It will thus be seen that when spring actuating member 6 is depressed, the device will continue to provide an indication of the previous position of the spring which will assume its new position only when member 6 is released. If each position of a spring is taken as representing a designated bit of information, the device will, while spring actuating member 6 is depressed, contain the new information as well as retain an indication of its old information and this property of the bi-stable device is, in accordance with this invention, utilized in the binary accumulator circuit shown in Figs. 1 and 2 to obviate the need for special means for effecting the required borrow or carry. It will be evident, however, that other types of bi-stable devices may be used as well, provided they have the same properties as the particular bi-stable device described herein.

The circuitries associated with the bi-stable devices are identical in the several stages and only the circuitry associated with device 10 of stage I will therefore be described in detail. In order to simplify the identification of the corresponding parts of the other stages they have been designated by reference numerals differing by ten in the successive stages. Associated with plunger 7 of stage I and actuated thereby is a movable contact arm 11 which will be in engagement with contact 12 when the plunger is in its inward or retracted position, and in engagement with contact 13 when the plunger is maintained in its outward or extended position by the spring. Similarly, plunger 8 cooperates with a contact arm 14 to separate it from a contact 15 when this plunger is in its extended or outward position and to permit it to engage this contact when spring 3 assumes its left hand stable position thereby allowing plunger 8 to move inwardly into opening 4. Each stage is also provided with a contact arm such as contact arm 16 of stage I ganged for simultaneous movement with the corresponding contact arms 26, 36, 46 and 56 of stages II, III, IV, and V, respectively. These contact arms together with their associated contacts may be termed the "add-subtract" switch and has a position wherein the arms will be to the left as shown in Fig. 1 wherein contacts 17, 27, 37, 47 and 57 will be in engagement with their respective contact arms to condition the circuit for an adding operation, and to the right wherein contacts 18, 28, 38, 48 and 58 will be in engagement with their respective contact arms to condition the circuit for a subtracting operation as will hereinafter be fully explained. Windings 19, 29, 39, 49 and 59 are provided for depressing, when actuated, through individual armatures, the spring actuating members 6 of the bi-stable devices 10, 20, 30, 40 and 50, respectively. One side of each of the windings is connected to a common lead 60 which may be connected to a common reference potential of the circuit, which will herein be termed ground, through a circuit conditioning switch 61.

Each of the stages is provided with a pair of input or register contacts 62 and 63, 64 and 65, 66 and 67, 68 and 69, and 70 and 71, respectively. Each pair of contacts is ganged together and may be selectively operated, for example, by means responsive to certain signal input apparatus. One contact of each pair, namely contacts 62, 64, 66, 68 and 70, is connected to a common lead 72 which may be connected to the positive terminal of a source of D.C. potential 73, such as a storage battery, through a switch 74. The other contact of each pair, namely contacts 63, 65, 67, 69 and 71, is connected to a common lead 75 which may be connected to the negative terminal of a source of D.C. potential 76 through a switch 77. The negative terminal of source 73 and the positive terminal of source 76 are connected to ground.

There is also provided a multi-contact relay 78 which may be operated by closing a switch 79 to complete an energizing circuit from a source of D.C. potential 80 for selectively conditioning the accumulator for operation or for zeroizing. The relay is provided with an armature and a set of front and back contacts for each stage, the armatures being connected to respective ones of energizing windings 19, 29, 39, 49 and 59. The front contacts 81, 82, 83, 84 and 85 are connected to contacts 62, 64, 66, 68 and 70, respectively.

In order to cause the operating windings for the bi-stable devices to be energized when either a certain carry or borrow circuit condition exists in a prior stage or when the register contact of that particular stage is in closed condition, but to remain deenergized when both or neither condition is present, there is provided for each of the respective windings of stages II, III, IV, and V a bridge circuit in which a pair of series connected resistors having one of the energizing windings connected to the juncture therebetween form two legs and D.C. sources 73 and 76 form the remaining two legs. No bridge circuit is, of course, needed for stage I inasmuch as there can be no carry from a previous stage, unless an end-around connection as described in the embodiment shown in Fig. 2 is used. Only the bridge circuit of stage II will be described, it being understood that the description thereof applies to the other three bridge circuits as well. In stage II, there are provided series connected resistors 90 and 91 having the winding 29 connected to the juncture 92 therebetween. The outside end, i.e., the left end as viewed in the drawing, of resistor 91 will be connected through a circuit which will be identified in the description of the operation to the negative terminal of source of potential 76 when there is a carry or borrow from an earlier stage, and the outside end, i.e., the right end as viewed in the drawing, of resistor 90 will be connected to the positive terminal of source 73 when the register contacts of stage II are closed. The resistors are of substantially equal resistance value and sources 73 and 76 are of substantially equal potential. It will therefore be evident that point 92, the juncture between the resistors, will be at substantially ground potential, i.e., the potential of the juncture between the sources, when the bridge circuit is completed and the resistors are connected thereacross. The other side of winding 29 will be connected to ground through switch 61, and as both sides of the winding are at ground potential, no current will flow therethrough. This winding will therefore remain deenergized when the outside ends of the series connected resistors are connected to the respective positive terminal of source 73 and negative terminal of source 76, and will also, of course, remain deenergized when neither side of the series connected resistor combination is connected to a source of potential. If one resistor is connected to a source of potential and not the other, it will be evident that a current will flow through the energizing winding to energize it. Windings 29, 39, 49 and 59 and their associated armatures are so arranged and constructed that they will actuate the associated bi-stable device when energizing current flows therethrough in either direction. Thus, bi-stable device 20 will be actuated if either resistor 91 is connected to the negative terminal of source 76 when resistor 90 is disconnected from source 73, or if resistor 90 is connected to the positive terminal of source 73 when resistor 91 is disconnected from source 76. Stages III, IV and V are provided with similarly arranged pairs of resistors 93 and 94, 96 and 97, and 99 and 100, respectively. The bridge circuits comprising the two D.C. sources 73 and 76 and two resistors together with their associated energizing winding which is energized only when one of two conditions is present but not when both or neither is present may therefore be termed a "half-adder" or a mutually exclusive "or" circuit.

In order to provide a circuit for the transfer of carry or borrow signals from stage to stage under certain conditions which will hereinafter be described, there are provided contacts 102, 103, 104 and 105 for stages II, III, IV, and V, respectively, which are preferably ganged to and operated simultaneously with the pair of register contacts of the same stage. Thus, contacts 102 will be ganged to and operated together with register contacts 64 and 65 of stage II, contacts 103 will be operated with contacts 66 and 67 of stage III, contacts 104 will be operated with contacts 68 and 69 of stage IV, and finally, contacts 105 will be operated with contacts 70 and 71 of stage V. It will be seen from Fig. 1, that the signal transfer contacts are connected in the circuit so as to establish, when closed, a connection between that side of resistors 94, 97 and 100 which may be connected to source 76 when the register contacts and the contacts controlled by plunger 7 of the bi-stable device of that particular stage are in a closed circuit position, and the same side of the corresponding resistor in the preceding stage through an asymmetrical device. To illustrate, that side of resistor 94 of stage II which may be connected to source 76 through contacts 27, 23, 65 and 77 is connected to the corresponding side of resistor 91 through contacts 102, when closed, and asymmetrical device 106. Resistor 97 may, in the same manner, be connected to resistor 94 through contacts 103 and asymmetrical device 107, and resistor 100 may be connected to resistor 97 through contacts 104 and asymmetrical device 108. In the last stage, in the present example stage V, the contact arm 56 of the add-subtract switch is connected to resistor 100 through contacts 105 and asymmetrical device 109.

In order to provide an alternate connection between the same points of these resistors when a carry or borrow signal is to be transmitted from one stage to the next while the register contacts involved and hence the contacts 102 through 105 operated therewith are open, there are provided asymmetrical devices 112 through 115, connected respectively between the contact arms 23, 33, 43 and 53 and the contact arms of contacts 102, 103, 104 and 105 of the same stage. It will thus be seen that, for example, when contacts 102 are open there may be established between stages II and I a carry connection through contacts 27 and 23 and asymmetrical devices 112 and 106, and a borrow connection through contacts 28, 22 and asymmetrical devices 112 and 106. Similar alternate carry and borrow connections are provided between the other stages as will readily be apparent from the drawing. Asymmetrical devices 106 to 109 and 112 to 115 are provided in order that the carry or the borrow signal may be transferred from one stage to the succeeding stage while preventing a transfer to a preceding stage which, if it should occur, would result in faulty operation.

There is also provided circuit means for obtaining a visual indication of the information stored or accumulated in the circuit without thereby erasing such information, or, if desired, for simultaneous reading and erasing the information, that is, reading and zeroizing the circuit. For this purpose there are provided a source of D.C. potential 116 and a reading, or a reading and zeroizing switch 117, and for each stage an indicating lamp 118 to 122 such as a neon lamp, for example. The reading and zeroizing circuits for the several stages are identical and are connected in parallel so that the following description of the circuits for stage I will apply to the other stages as well. The reading circuit may be traced from the positive terminal of source 116 through contact 15, contact arm 14 which will be in engagement with contact 15 when plunger 8 is permitted by spring 3 to be withdrawn into opening 4, asymmetrical device 131, indicating lamp 118 to ground and through reading switch 117 back to the negative terminal of the source. It will thus be seen that the indicating lamp of each stage in which spring member 3 is in its stable left-hand position will be lighted when switch 117 is closed.

The zeroizing circuit for stage I may be traced from the positive terminal of source 116 through contact 15, contact arm 14, asymmetrical device 126, back contact 121, of relay 78 energizing winding 19 for bi-stable device 10, circuit grounding switch 61 and reading and zeroizing switch 117. Therefore, to zeroize or clear the circuit, switch 79 has to be opened to de-energize relay 78 to permit the armatures thereof to engage their respective back contacts and grounding switch 61 has to be closed before the reading and zeroizing switch 117 is closed. In each stage wherein the bi-stable device is in such a position that contact arm 14, 24, 34, 44, or 54, is in engagement with its associated contact 15, 25, 35, 45, or 55 the current will flow through and energize the solenoid winding associated with such bi-stable device to cause the device to assume its other stable position when switch 117 is again opened to de-energize the circuit. Thus, in the illustrated embodiment of Fig. 1 solenoid winding 29 of bi-stable device 20, solenoid winding 39 of bi-stable device 30 and solenoid winding 59 of bi-stable device 50 will be energized to cause these bi-stable devices to assume their zero positions when switch 117 is momentarily closed.

In Fig. 2 there is shown another embodiment of the invention wherein there is provided an end-around connection from the last stage to the first stage so that a carry from the last stage may be transferred to the first stage, and wherein the balanced bridge circuit of Fig. 1 is replaced by an electromagnetic device having two separate opposing energizing windings. In order to simplify the presentation of the circuit no reading means nor zeroizing means is shown but the manner in which such means may be provided in this embodiment will be evident from the above description thereof in connection with the embodiment illustrated in Fig. 1. As in Fig. 1 there are shown in Fig. 2 an accumulator having five stages. The stages are designated with letters A, B, C, D and E, and each stage includes a mechanical bi-stable device of the type described above adapted to accept new information while retaining the old information until the accumulation operation is completed. The mechanical bi-stable devices in the successive stages are designated with reference numbers 210, 220, 230, 240, and 250, respectively. The operation of the bi-stable devices was described with reference to the embodiment shown in Fig. 1 and in the above mentioned application by Edgar A. Brown, and will, therefore, not be repeated. It will be noted that each bi-stable device is in the embodiment of Fig. 2 provided with only a single plunger 207 operated by spring 209. The spring is shifted from one stable position to the other by successive force pulses applied to spring actuating member 206. As in the embodiment shown in Fig. 1, each stage is provided with an add-subtract switch, and these switches are preferably ganged together so that there will be no possibility of forgetting to close one or more of them. The movable add-subtract contact arms are designated with the reference numbers 216, 226, 236, 246 and 256, in the respective stages A through E, respectively, and the contact arms operated by the plungers of the bi-stable devices are designated by reference numbers 211, 221, 231, 241, and 251, respectively. Because of the different type of actuating means for the bi-stable devices used in the embodiment shown in Fig. 2 only a single set of register contacts is needed for each stage and these contacts are designated in the respective stages A to E with reference numbers 201, 202, 203, 204 and 205.

The actuating means for the bi-stable devices comprise electromagnetic devices, such as solenoids, each having two opposing energizing windings. The actuating solenoid for the bi-stable device of stage A is provided with windings 260 and 261 and the solenoids for stages B, C, D and E are provided with oppositely wound windings 262 and 263, 264 and 265, 266 and 267, and 268 and 269, respectively. These solenoids are so constructed that a current flow through either of the windings thereof will cause the spring actuating member of the associated bi-stable device to be depressed while current flow through both will in effect cancel each other and will have no effect on the bi-stable device associated therewith.

The operating potential for the circuit is provided by a D.C. source 270 having its negative terminal connected to ground and its positive terminal connected to each of the contact arms of the register contacts 201 to 205. The operating switch for the circuit is designated with reference number 273 and is connected between ground and a lead 274 which is connected to one end of each of the energizing windings 260 through 269. As in the embodiment illustrated in Fig. 1, each stage is connected to the next stage by a carry and borrow signal transfer connection comprising an asymmetrical device and a pair of contacts, preferably ganged with the register contacts of that particular stage so that they will be operated together. The signal transfer connection between stages A and B comprises asymmetrical device 275 and contacts 280 connected in series between windings 260 and 262 and similar connections between corresponding windings of the successive stages are made up, respectively, of asymmetrical devices 276 to 279 and contacts 281 to 284. It will be noted that asymmetrical device 279 and contacts 284 form an end-around connection between the last stage E and the first stage A through lead 285. Alternate connections shunting the above described connections are provided between the same windings but under the control of the bi-stable device of each stage in order to provide a carry or borrow connection under certain conditions when the transfer contacts are open as will be explained under the description of the operation. The alternate connection between stages A and B comprises an asymmetrical device 286 connected between winding 260 and contact arm 211 operated by bi-stable device 210. Asymmetrical devices 287 to 290, respectively, form corresponding connections between the successive stages.

Asymmetrical devices 291 to 295 are provided in the respective stages A to E between the register switch and the plunger operated contact arm of each stage in order to prevent reverse current flow from one stage to a preceding stage to cause a faulty operation thereof.

Although the values of the components shown in Figs. 1 and 2 are not critical, voltage sources 73, 76 and 116 of Fig. 1 may each be 150 volts in which case the bridge resistors 90, 91, 93, 94, 96, 97, 99 and 100 as well as windings 19, 29, 39, 49 and 59 may each have a resistance of 500 ohms, and, in Fig. 2, source 270 may be 150 volts and each solenoid winding 260 to 269 may have a resistance of 500 ohms.

*Operation*

The operation of the embodiment of the invention illustrated in Fig. 1 will first be described. This circuit is particularly well adapted for accumulating, that is, adding or subtracting quantities expressed in the binary code. It should be kept in mind that when adding the binary digits "1" and "0" the results is "1," and when adding the digits "1" and "1" the result will be "0" with one to carry. When binary digits "1" and "1" are added when there is also a carry from the next lower order, the result will be "1" with one to carry.

It will be assumed for the sake of illustration that when the bi-stable device is in the condition wherein the spring associated therewith is in its right-hand stable position such as shown, for example, by the bi-stable device 10 in stage I, the binary digit "0" is stored therein while when the spring is in its other stable position such as shown, for example, by the bi-stable device 20 of stage II, the binary bit "1" will be said to be stored therein.

In the following description binary numbers will be expressed with the digits of the least arithmetical significance appearing to the left so that, when adding two numbers, the extreme left-hand digits are added first and the carry, if any, will be added to the digits to the right thereof. Assume now that a number in the binary code such as "01101" has been accumulated in the circuit and that the binary devices are positioned correspondingly. The binary devices will then be in the positions indicated in Fig. 1. The numbers stored in the circuit will herein be defined as the "augend," and the number to be added thereto will be defined as the "addend." Assume next that it is desired to add the binary number of "11100," the addend, to the number already accumulated in the circuit. This number will be entered in the register contacts of the appropriate stages with the arithmetically least significant digits entered in stage I, and the increasingly significant digits entered in the successive stages II, III, IV and V. Under the assumptions stated above, the register contacts 62 to 71 and associated transfer contacts 102 to 105 and the bi-stable devices 10, 20, 30, 40 and 50 will be in the positions shown. Inasmuch as an adding operation is to be performed the add-subtract switch is placed in its adding position as shown, wherein the switch arms thereof will be in engagement with their respective contacts 17, 27, 37, 47 and 57. In order to prepare the circuit for operation, switch 79 is closed to energize relay 78 which will cause all the armatures associated therewith to engage their respective front contacts 81 to 85. Ground switch 61 is then closed to provide a ground connection for the circuit whereupon operating switches 74 and 77 which preferably are ganged together are closed simultaneously. The condition of the energized circuit will now be described. Solenoid winding 19 for bi-stable device 10 of stage I will be energized as it will be in circuit with source 73 through closed contacts 74, 62, 81 and 61. Energization of winding 19 will, as it was explained above, cause spring actuating member 6 of device 10 to be depressed and thereby condition spring 3 for movement to its other stable position when the actuating member 6 is again released, but as long as winding 19 remains energized actuating member 6 will remain depressed and plunger 7 and its associated contact arm 11 will remain in the position shown in Fig. 1. It will be recalled that it was required to add binary digit "1," entered by closing the register contacts 62 and 63, to digit "0" which was stored in bi-stable device 10. The result requires that the bi-stable device be actuated so as to assume its "1" position when the accumulation operation is completed with no carry to the next stage. Energization of winding 19 will condition the bi-stable device so that it will change to its "1" position when winding 19 is again deenergized. The open contact 13 will prevent a carry from being transmitted to stage II.

Coming now to stage II, it will be remembered that a digit "1" is stored in bi-stable device 20 and that a digit "1" is entered in register contacts 64 and 65. This will call for changing bi-stable device 20 to its "0" position with a carry to the next stage. Resistor 90 will be connected to the positive terminal of source 73 through closed contacts 74, 64 and 82, and a current will flow therethrough and through solenoid winding 29 of bi-stable device 20 to ground through closed switch 61. It will be noted that resistor 91 is disconnected from source 76 by the open contact 13 and from stage II by asymmetrical device 106 and no current will therefore flow through this resistance. Energization of winding 29 will depress the spring actuating member 6 of bi-stable device 20 to condition the spring thereof to assume its other stable position after the spring actuating member is again released. Thus when the operation is completed, bi-stable device 20 will assume its "0" position as required. It is also required to transfer a carry to the next stage, in this case stage III, so that it may be taken into account in the operation of bi-stable device 30 of stage III. This required carry is transferred to stage III by causing current to flow through energizing winding 39 of bi-stable device 30 and resistor 94 from source 76 through a circuit which may be traced through closed contacts 27, 23, 65 and 77. This by itself would cause bi-stable device 30 to be conditioned for change-over to its "0" position which would, of course, give an incorrect indication inasmuch as digit "1" in the addend of stage III added to digit "1" in the augend together with a carry from stage II requires bi-stable device 30 to remain in its "1" position with a carry to the next stage. Now, referring to the circuit in stage III, it will be noted that resistor 93 is connected to the positive terminal of source 73 through closed contacts 83, 66 and 74. The positive terminal of source 73 will therefore be connected to the right-hand side of resistor 93 while the negative terminal of source 76 will, as noted above, be connected to the left-hand side of resistor 94. Since sources 73 and 76 are of equal potential and resistors 94 and 93 are of equal resistance, the juncture 95 between these resistors will be at the potential of the juncture between sources 73 and 76, i.e., ground potential. Both ends of winding 39 will therefore be at ground potential and no current will flow therethrough and no energization of the bi-stable device 30 will take place. Bi-stable device 30 will, therefore, remain in its "1" position as required. It was also required that a carry be transferred to the next stage, namely, stage IV. This is accomplished by the connection of the left-hand side of resistor 97 to the negative terminal of source 76 through closed contacts 37, 33, 67 and 77 establishing an energizing circuit for winding 49 of bi-stable device 40 of stage IV.

In stage IV the digit "0" was entered in the register contacts 68 and 69 and the digit "0" is stored in the bi-stable device 40. With a carry from stage III it is required, for a correct result, that bi-stable device 40 be changed to its other stable, or "1" position with no carry. This is accomplished by the energization of winding 49. Through the circuit traced above, it will be noted that the bridge circuit therefor is incomplete inasmuch as resistor 96 is disconnected from the positive terminal of source 73 by the open register contact 68. No carry signal will be transmitted to the next stage, stage V, since the left-hand side of resistor 100 is disconnected from source 76 by open contacts 43 and 69 and from the preceding stage by open contacts 43 and 104. No current will therefore flow through energizing winding 59 from source 76, and because of open register contacts 70, no current will flow therethrough from source 73, and this winding will therefore remain de-energized. Bi-stable device 50 will consequently correctly remain in its "1" position. It will thus be seen that the new information added to bi-stable devices 10, 20 and 40 will cause these devices to assume their other stable positions when the circuit is again de-energized. To complete the accumulation operation, operating switches 74 and 77 are opened simultaneously to de-energize the circuit and thereby cause whatever bi-stable devices that had their associated solenoid winding energized to assume their other stable positions.

If it is now desired to add a new binary number to the accumulated result, the new number is entered into the required ones of register contacts 62 through 71, and the operation described above may then be repeated by again closing operating contacts 74 and 77. If it is desired to read the information stored in the bi-stable devices without destroying the information, switch 79 is first closed so as to energize relay 78 and cause all the armatures thereof to engage the front-contacts, whereupon reading switch 117 is closed to energize the reading circuit. With the bi-stable devices in the positions shown in Fig. 1, the indicating lamps 119, 120 and 122 of stages II, III and V, respectively, will be connected in parallel between the positive terminal of source 116 and ground through closed switches 25, 35 and 55, respectively, and these lamps will, therefore, light up. The indicating lamps of stages I and IV, however, will remain off inasmuch as the contacts 15 and 45 associated therewith, respectively, are kept in open condition by the plunger 8, associated therewith.

If it is desired to read the information and at the same time to erase it, i.e., to zeroize or clear the circuit, relay 78 is de-energized by opening switch 79 and grounding switch 61 is closed before closing reading switch 117. This will cause the armatures of relay 78 to engage the back contacts 121 through 125 to establish a circuit from source 116 through the energizing winding of the bi-stable devices which are in their "1" position. In the above example current will flow through the energizing windings 29, 39 and 59 to depress the spring actuating members of bi-stable devices 20, 30 and 50 whereby, when the switch 117 is again opened, these last-named bi-stable devices will assume their "0" position so that all the bi-stable devices will be in "0" position.

It was noted above that when a carry is transmitted from one stage to a subsequent stage, the left-hand side of the left-hand resistor of the bridge circuit of the stage to which a carry is to be transferred will be connected to the negative terminal of source 76. Whenever a carry is to be transferred from one stage to the next succeeding stage it is necessary that either the contacts 102 to 104 or the contacts 23, 33, 43 or 53 of the originating stage be closed. In either event a circuit will be established between corresponding points of the bridge circuits of two or more successive stages. Asymmetrical devices 106 through 109 and 112 through 115 are poled so as to transmit a transfer signal only from one stage to the succeeding stage while preventing the transmission of a signal to a preceding stage.

In the embodiment described in Fig. 1, there are provided asymmetrical devices 126 to 130 in the respective zeroizing circuits and asymmetrical devices 131 to 135 in the respective reading circuits in order to prevent "sneak" circuits in the event that several circuits such as that shown in Fig. 1 are connected in parallel. By connecting several of these circuits in parallel it will be possible to accumulate the binary number entered in the register contacts 62 through 71 to the binary numbers stored in selected ones of several accumulator circuits.

To condition the circuit of Fig. 1 for a subtraction operation, the add-subtract switch is placed in its subtract position whereby the switch arms associated with contacts 17, 27, 37, 47 and 57 will be separated therefrom and will engage the respective ones of contacts 18, 28, 38, 48;

and 58. The number to be subtracted is entered in register contacts 62 through 71. As before, switch 61 is closed to connect the circuit to ground, and relay switch 79 is closed to energize relay 78 to cause the armatures thereof to engage front contacts 81 through 85, respectively. Ganged switches 74 and 77 are then closed to initiate the subtraction operation.

Assume, as before, that a binary number 01101, now the minuend, is stored in the binary devices 10, 20, 30, 40 ad 50 so that these devices and the contacts controlled by them will be in the positions shown in Fig. 1, and that a binary number 11100, the subtrahend, is to be subtracted therefrom. The number 11100 is entered in the register contacts by closing contacts 62 to 67 and leaving contacts 68 to 71 open as shown.

In stage I digit "1" entered in contacts 62 and 63 is to be subtracted from digit "0" stored in bi-stable device 10, and the required result calls, of course, for changing the position of bi-stable device 10 from its "0" to its "1" position and borrow one from stage II. Winding 19 is energized by being connected to source 73 through the closed contacts 74, 62, 81 and 61 to thereby actuate the bi-stable device 10 to condition it to be changed to its other stable position when its winding is again de-energized. The required borrow from stage II is accomplished by the connection of the negative terminal of source 76 to the left-hand side of resistor 91 through the closed contacts 18, 12, 63 and 77 to cause an energizing current to flow through winding 29 of bi-stable device 20 unless resistor 90 is simultaneously connected to source 73 to complete the bridge circuit described above.

In stage II digit "1" is stored in bi-stable device 20 and digit "1" is entered in register contacts 64 and 65 to be subtracted from the quantity stored in the bi-stable device. Inasmuch as there was a borrow from stage II, it is required that the bi-stable device 20 remain in its "1" position and that one be borrowed from the next stage, namely, stage III. It was noted above that the borrow from stage I caused solenoid winding 29 of stage II to be connected to source 76, but the closed register contacts 64 will connect the positive terminal of source 73 to the right-hand side of resistance 90 to complete the bridge circuit thereby establishing ground potential on the juncture 92 between the resistors. No current will, therefore, flow through winding 29 and hence no change in position of bi-stable device 20 will be effected. The required borrow from stage III is effected by connecting the left-hand side of resistor 94 of the bridge circuit for the solenoid winding 39 through closed switch 102 and asymmetrical device 106 to the left-hand side of resistor 91, which, as it was noted above, is connected to the negative terminal of source 76 through closed contacts 18, 12, 63 and 77. Inasmuch as the digit in the subtrahend is a "1," contacts 66 and 67 are closed and the right-hand side of resistor 93 is therefore connected to the positive terminal of source 73 through closed contacts 83, 66 and 74 to complete the bridge circuit. Consequently, as above explained, juncture 95 between resistors 94 and 93, will be at ground potential and no energizing current will flow through winding 39 and bi-stable device 30 will not, therefore, be actuated. It will be noted that this is the result required under the assumed conditions since digit "1" together with a borrow from the previous stage is to be subtracted from the digit "1" stored in the device 30. A digit "1" has to be borrowed from the next succeeding stage, namely, stage IV, and this is accomplished by closed contacts 103 and asymmetrical device 107 which connect the left-hand side of resistor 97 to the left-hand side of resistor 94, which, as above pointed out, is at the potential of the negative terminal of source 76.

In stage IV a digit "0" is stored in bi-stable device 40 and a digit "0" is entered in the register contacts 68 and 69. The borrow from stage III requires the binary device 40 to change from its "0" position to its "1" position and to borrow one from the next stage, namely stage V. It will be recalled that the left-hand side of resistor 97 is connected to the negative terminal of source 76 and as resistor 96 is disconnected from source 73 by open contact 68, the bridge circuit for solenoid winding 49 will be incomplete and a current will flow through resistor 97 to energize the winding and actuate bi-stable device 40.

In stage V a digit "1" is stored in bi-stable device 50 and a digit "0" is entered in the register contacts 70, 71. The borrow from stage IV will require, for a correct result that bi-stable device 50 be shifted to its "0" position. The required borrow connection to stage V is established by connecting the left-hand side of resistor 100 through closed contacts 48 and 42, asymmetrical devices 114 and 108 to left-hand side of resistor 97, which is connected to source 76 through the circuit traced above. Resistor 99 is disconnected from source 73 by the open register contacts 70 and the bridge circuit for solenoid winding 59 will therefore be incomplete and a current will flow through winding 59 and resistor 100 to actuate bi-stable device 50.

It will be seen from the above that bi-stable devices 10, 40 and 50 will be actuated by having the solenoid windings thereof energized and when operating contacts 74 and 77 are again opened, these bi-stable devices will assume their other stable positions. The binary number accumulated in the binary devices will be "11110," which is the correct result when subtracting the binary number 11100 from the binary number 01101.

In describing an addition operation of the circuit illustrated in Fig. 2, it will be assumed that the binary number "10110" is stored or has been accumulated in the bi-stable devices 210, 220, 230, 240 and 250 and that an addend of "11010" has been entered in contacts 201, 202, 203, 204 and 205, the digits "1" being represented, as in the embodiment of Fig. 1, by closed contacts and the digits "0" by open contacts. As before, it is assumed that the bi-stable devices are in their "1" conditions when the springs 3 associated therewith are positioned to the left and that they are in their "0" conditions when the springs are positioned to the right as viewed in the drawing. A complete accumulation will be effected by momentarily closing switch 273. The condition of the circuit when this switch is closed will first be considered. The closed register contacts 201 of stage A will cause energizing current to flow through solenoid winding 261, which, in the absence of energization of the opposing winding 260, will actuate bi-stable device 210 to cause it to be changed to its other stable position when the circuit is again de-energized. However, as before, a plunger 207 of bi-stable device 210 will be maintained in its extended position by spring 209 until the circuit is de-energized. In stage A a digit "1" is to be added to the digit "1" stored in bi-stable device 210 and the latter is therefore required to change from its "1" position to its "0" position and to carry one to the next stage. The carry to stage B is effected by a circuit connecting winding 262 of bi-stable device 220 to the terminal of source 270 through closed contacts 201, 213 and 217 and rectifier 291 to cause a current to flow therethrough.

With bi-stable device 220 in its "0" position and having a digit "1" added thereto as well as a carry from stage I, the device is required to remain in its "0" position with a carry to the next stage. Closed contacts 202 will connect energizing winding 263 to the source 270 and energizing current will flow through both windings 262 and 263. It was above pointed out that energization of both windings will cancel each other and bi-stable device 220 will therefore remain de-energized.

In stage C there is stored a digit "1" in the bi-stable device 230 to which there is to be added a digit "0" as shown by open register contacts 203 and a carry from stage B. For a correct result bi-stable device 230 should be changed to its "0" position with a carry to stage D. The carry connection from stage B to the solenoid winding 264 of stage C is established through closed contacts 281 and asymmetrical device 276 from the terminal of winding 262 which, as above pointed out, is connected to the positive terminal of source 270. An energizing current will flow through winding 264 and as no current will flow through opposed energizing winding 265 since register contacts 203 are open, bi-stable device 230 will be actuated. It is also required to carry one to stage D and this is accomplished through a connection from winding 264 through the closed contacts 237, 233 and rectifier 288 to winding 266 of stage D.

There is stored in bi-stable device 240 of stage D a digit "1" to which a digit "1" from the addend and a digit "1" from stage C are to be added. As above pointed out the carry is transferred to winding 266 through a connection to the terminal of winding 264 which is connected to the positive terminal of source 273 to cause an energizing current to flow through winding 266. A current will also flow through winding 267 because of closed register contacts 204 connecting this winding to source 270, and bi-stable device 240 will therefore remain de-energized. Inasmuch as a carry of "1" and a digit "1" in the addend were added to the digit "1" stored in the bi-stable device 240, a carry connection must be established to stage E. The carry connection is made between the terminal of winding 268 and the terminal of winding 266, which is at the potential of the positive terminal of source 270, through two circuits which may be traced through closed contacts 247 and 243 and asymmetrical device 289, and through closed contacts 283 and asymmetrical device 278. A third carry connection may be traced through closed register contacts 204, asymmetrical device 294 and closed contacts 243 and 247. This will cause a current to flow through energizing winding 268, and because of absence of current flow through winding 269 due to open register contacts 205, bi-stable device 250 will be energized. The digit "0" entered in the register contacts 205 of stage E added to the digit "0" stored in the bi-stable device 250 will, of course, not call for a carry to winding 260 of stage A through the end-around connection provided. If now operating contacts 272 are opened so as to de-energize the circuit, energized bi-stable devices 210, 230 and 250 will assume their stable position opposite from that shown in Fig. 2 and the resulting binary number which then will be stored in the circuit will be "00011." This is, of course, the correct result called for when the binary numbers 11010 and 10110 are added together, the numbers being expressed with their least arithmetically significant digits to the left.

A second binary number may then be added to the accumulated binary number by entering such new number in the register contacts, or, if desired, this number may be subtracted from the accumulated number by changing the add-subtract switch to its "subtract" position.

A subtraction operation of the circuit shown in Fig. 2 will now be described. Assume that the binary number 11010 entered in the register contacts 201 to 205 in Fig. 2 is to be subtracted from the number stored in the bi-stable devices, namely 10110. The add-subtract switch is placed in its "subtract" position wherein the switch arms thereof will engage the respective contacts 218, 228, 238, 248 and 258 and be separated from contacts 217, 227, 237, 247 and 257. If now operating switch 273 is momentarily closed, the required ones of the bi-stable devices will change over to their other positions so as to have collectively stored therein the correct result in the manner now to be described.

In stage A closed contacts 201 will permit energizing current to flow through winding 261 to actuate bi-stable device 210, unless there is a borrow from stage E over the end-around connection 285 which will cause a current to flow through opposing winding 260. It will be assumed that there is no borrow from stage E. To subtract digit "1" from the digit "1" stored in device 210 in the absence of a borrow, requires the device to be changed to its "0" position with no borrow. Energization of winding 261 will cause the device to change over to its "0" position and the open contact 212 will disconnect winding 262 from source 270. It was assumed that there was no borrow from stage A over the end-around connection and winding 260 will, therefore, not be energized and no current will flow through closed contacts 280 and asymmetrical device 275. Asymmetrical device 286 will prevent current from flowing from contact arm 211 to windings 260 and 262.

Bi-stable device 220 is in its "0" position and to subtract therefrom digit "1" entered in the register contacts 202 it is required to change the bi-stable device to its "1" position and to borrow "1" from stage C. Closed contacts 202 will cause current to flow through winding 263 which will actuate bi-stable device 220. It was noted that opposing winding 262 is not energized. The borrow connection to the next stage is completed through closed contacts 228 and 222, and asymmetrical device 292. Asymmetrical devices 287 and 276 will prevent current flow back to winding 262.

Winding 265 of stage C will be disconnected from source 270 by open register contacts 203 and hence energized winding 264 will actuate bi-stable device 230. Inasmuch as a digit "1" was stored in bi-stable device 230 and a digit "0" to be subtracted therefrom was entered in register contacts 203, it is required that the bi-stable device change to its "0" position with no borrow from stage D. Open contacts 282 and 232 will establish the required no borrow connection to stage D.

In stage D there is a digit "1" stored in bi-stable device 240 and a digit "1" entered in the register contacts 204 so that it is required that this bi-stable device be changed over to its "0" position with no borrow from stage E, it being recalled that there was no borrow from stage C. Winding 266 is disconnected from source 270 and from stage C by open contacts 282, 232 and 203 so that the energization of winding 267 through closed register contacts 204 will cause bi-stable device 240 to be actuated. Inasmuch as winding 266 is disconnected from source 270 as noted above, closed contacts 283 will conduct no current to winding 268 and open contacts 242 will disconnect this winding from source 270. Asymmetrical device 289 will prevent current flow from contact arm 241 to windings 266 and 268.

Register contacts 205 of stage E have a digit "0" entered therein and, as there is no borrow from stage D, the bi-stable device 250 is required to remain in its present "0" position with no borrow over the end-around connection 285. It was noted that winding 268 is disconnected from source 270 by open contacts 242 and that closed contacts 283 are of no consequence since winding 266 is also disconnected from the source, and as open register contacts 205 disconnect winding 269 from source 270, bi-stable device 250 will remain in its present "0" position as required. End-around connection 285 is disconnected from source 270 and from stage D by open contacts 284 and 205, so that the assumption made at the beginning that there was no borrow from stage A and that winding 260 thereof was not energized is valid.

When circuit switch 273 is again opened, actuated bi-stable devices 210, 220, 230 and 240 will shift over to their opposite positions and the binary number accumulated therein will be 01000 which is the correct result when the number 11010 is subtracted from the number 10110.

While only two specific embodiments of the invention have been described, it will be evident to those skilled in the art that various changes may be made therein without departing from the true spirit and scope of the invention.

We claim:

1. A parallel binary accumulator circuit comprising an initial stage, a plurality of intermediate stages, and a final stage, each of said stages including first switch means including a pair of contacts positionable independently of said switch means of said other stages and having an open position and a closed position to represent binary digits to be accumulated in that stage, second switch means including a pair of contacts having an open position and a closed position positionable to represent binary digits accumulated in that stage, and a binary device including operating means therefor and means responsive to said device operatively connected to said second switch means to close and open said contacts in accordance with the stable state of said device, said operating means of said intermediate stages and said final stage being connected in circuit with said first switch means of the same stage and said second switch means of a preceding stage and being energizable in response to predetermined positional combinations of said pairs of contacts thereof, each of said binary devices being operated by energization of said operating means thereof to an intermediate, unstable position for changeover to its other stable state without operating said second switch means of the same stage and operated by subsequent deenergization of said operating means to its other state and thereby operate said pair of contacts of said last-named switch means to the other position thereof, each of said plurality of second switch means comprising a first single pole double throw switch having a first and second contact, each of said single poles being operable by the binary device of the same stage, a second single pole double throw switch in each stage having a third and fourth contact, the first contact and the second contact of a given stage being respectively connected to the third and fourth contact respectively of the same stage, the pole of each of said first single pole double throw switches being connected to the said first switch means of the same stage, and the pole of each of said second plurality of single pole double throw switches being connected respectively and individually to each of said operating means of the immediately following stage.

2. A parallel binary accumulator circuit comprising an initial stage, a plurality of intermediate stages, and a final stage, each of said stages including first switch means including a pair of contacts positionable independently of said switch means of said other stages and having an open position and a closed position to represent binary digits to be accumulated in that stage, second switch means including a pair of contacts having an open position and a closed position positionable to represent binary digits accumulated in that stage, and a binary device including operating means therefor and means responsive to said device operatively connected to said second switch means to close and open said contacts in accordance with the stable state of said device, said operating means of said intermediate stages and said final stage being connected in circuit with said first switch means of the same stage and said second switch means of a preceding stage and being energizable in response to predetermined positional combinations of said pairs of contacts thereof, each of said binary devices being operated by energization of said operating means thereof to an intermediate, unstable position for changeover to its other stable state without operating said second switch means of the same stage and operated by subsequent deenergization of said operating means to its other state and thereby operate said pair of contacts of said last-named switch means to the other position thereof, each of said plurality of second switch means comprising a first single pole double throw switch having a first and second contact, each of said single poles being operable by the binary device of the same stage, a second single pole double throw switch in each stage having a third and fourth contact, the first contact and the second contact of a given stage being respectively connected to the third and fourth contact respectively of the same stage, the pole of each of said first single pole double throw switches being connected to the said first switch means of the same stage, and the pole of each of said second plurality of single pole double throw switches being connected respectively and individually to each of said operating means of the immediately following stage, each of said plurality of operating means comprising a first portion and a second portion, each of said first portions being independently energizable in accordance with the condition of said first switch means and said second switch means of preceding stages, and said second portion being energizable in response to the said first switch means of the same stage.

3. In multiple order, binary calculating apparatus of the type employing in each order a bistable device conditionable by energization thereof to shift, upon subsequent deenergization, from one bistable condition to another; electric circuit means for feeding successive values to said bistable devices for accumulation thereby, said circuit means including first and second control elements for each bistable device effective only upon energization of one and only one of said elements to so condition the associated bistable device, first switch means for each order operable by the associated bistable device and electrically connected to said second control element for the next higher order, and second switch means for each order for selectively connecting electric power to said first control element of the same order and through said first switch means of the same order to said second control element of the next higher order.

4. Electric circuit means in accordance with claim 3 in which said second switch means for each stage includes a switch connecting said second control element of the same order with said second control element of the next higher order, said switch being closed to complete such connection when said second switch means of the associated stage are closed to enter a unit in said stage.

5. Electric circuit means in accordance with claim 3 in which said control elements for each stage are opposed electromagnetic windings.

6. Electric circuit means in accordance with claim 3 in which said control elements for each stage are electric resistors having a common point connected to an energizing means for the associated bistable device, and in which said second switch means include a pair of switches connected to direct current potential of opposite polarity.

7. An accumulator circuit comprising an initial stage, a plurality of intermediate stages, and a final stage, each of said stages comprising a first contact means operable to represent binary digits to be stored, a second contact means operable to represent stored binary digits comprising a binary counter, and a plurality of third means operatively connected to said binary counters to operate said counters, a plurality of circuit means connecting each of said stages with the next succeeding stage, each of said third means of said intermediate stages and said final stage comprising a first portion and a second portion, each of said portions being energizable to actuate said counter but connected so as to counter-balance the effect of the other when both are simultaneously energized, each of said first portions of said third means having a first terminal, each of said first terminals of said first portions of said third means being interconnected by means of a circuit comprising said first and second contact means of the respective preceding stages and being responsive to the condition of said first and second contact means of all of the preceding stages, said plurality of circuit means each comprising first and second paths parallel to each other, each of said circuit means connecting the said first terminal of a given one of said first portions of the said third means to the said first terminal of said first portion of the next succeeding stage, the first of each of said parallel paths including the said first contact means of the next succeeding stage and the second of each of said parallel paths including the said second contact means of the next succeeding stage.

8. An accumulator circuit comprising a plurality of stages connected together to form a ring, each of said stages comprising a first contact means positionable to represent a binary bit, a binary counter, second contact means responsive to said binary counter and positionable to represent a binary bit, a first contact means to condition the accumulator circuit for addition or subtraction, and a second means adapted to cause actuation of said binary counter, said second means comprising a first portion and a second portion, each of said portions being energizable to actuate said counter but connected so as to counterbalance the effect of the other when both are simultaneously energized, a first plurality of circuit means individually connecting adjacent stages and adapted to effectuate carries and borrows between said stages, each of said first plurality of circuit means comprising a third contact means, each of said third contact means being operated in accordance with the condition of the said first contact means of the stage preceding the stage to which the carry is being effected, each of said first plurality of circuit means connecting the said first portion of the second means of the given stage with the said first portion of the second means of the adjacent stage, and a second plurality of circuits individually connecting adjacent stages and adapted to effectuate carries and borrows between said stages, each of said second plurality of circuits comprising the series combination of said second contact means of a given stage and the said first means of said given stage, each of said second plurality of circuits individually connecting the said first portion of the second means of a given stage with the said first portion of the second means of the adjacent stage.

9. An accumulator circuit in accordance with claim 8 comprising a power supply means common to all of said stages, each of said stages being connected in parallel with each other with respect to said power supply means, said power supply means being connected across the series combination of the said first contact means and the said second portion of the said second means of each stage, the said power supply means further being connected across the series combination of said first contact means, the said second contact means, the said first means of a given stage and the said first portion of the said second means of the stage next succeeding said given stage.

10. An accumulator circuit in accordance with claim 8 in which said binary device includes a bi-stable element, said bi-stable element remaining in its immediate prior operative position during the energization of the first or second portion of the second means therefor thereby retaining the old accumulation but conditioned for changeover to receive the new amount to be accumulated and changing its other stable position to combine the said old information and the said new amount to create a new accumulation upon deenergization of said first or second portion.

11. An accumulator circuit comprising a plurality of stages, said plurality of stages comprising an initial stage, a plurality of intermediate stages and a final stage, each stage comprising a first switching means positionable to represent a binary digit, a binary counter means having a first and a second stable relaxed condition, and a second switching means responsive to the condition of said binary counter and further adapted to represent a binary digit, said initial stage further comprising first means responsive to the condition of the said first switching means of said first stage to independently cause energization of said binary counter thereof, said plurality of intermediate stages and said final stage each comprising a second means energized in response to the condition of the said first and second switching means of the preceding stage, and a plurality of third means individual to said intermediate stages and said final stage energized in response to the said first switching means of the same stage, first carry means comprising said first switching means connecting each of said second means of said intermediate stages with the second means of the following stage, second carry means comprising said second switching means connecting each of said second means of said intermediate stages with the second means of the following stage, the said second and third means of an intermediate stage and said final stage being operable to cause actuation of the binary counter of the same stage when one of said second and third means is energized, said binary counter being conditioned for changeover to its other condition during energization of either one of said second and third means of the same stage and actuated from one of its stable conditions to the other of its stable conditions upon the deenergization of said energizing means.

12. An accumulator circuit in accordance with claim 11 comprising a first power supply means, a second power supply means, said first power supply means having its negative terminal connected to the positive terminal of said second power supply, connecting means electrically connecting said second and third means of each individual stage together, said second means of a given stage, said third means of said given stage, said first and second switching means of the stage preceding this stage and said first switching means of the same stage forming a series circuit connecting the positive terminal of said first power supply to the negative terminal of said second power supply, and fourth means connecting the negative terminal of said first power supply to the connecting means connecting said second means to said third means.

13. An accumulator circuit in accordance with claim 11 comprising a reading means, said reading means comprising a plurality of fourth contact means individually operable by each of said binary counter means, a signalling means in each stage, a third battery means common to all of said stages and adapted to selectively energize said signalling means in accordance with the condition of each of said fourth contact means.

14. An accumulator circuit in accordance with claim 11 comprising a zeroizing circuit, said zeroizing circuit comprising a plurality of fourth contact means, each of said plurality of fourth contact means being individually operable by one of said binary counters, a plurality of fifth contact means, one of said fifth contact means individual to each stage, a common means to jointly operate said plurality of fifth contact means, a third battery supply common to all of said stages, said fourth and fifth contact means of a given stage connecting when closed said third battery supply across said third means of said intermediate or final stages or said first means of said first stage to cause the binary devices which are not in zero position to become actuated.

15. In a circuit for accumulating binary information, a plurality of successive stages of which each stage comprises bi-stable means, switching means including a movable common contact and a pair of contacts alternately engageable with said common movable contact, said movable contact being operatively connected to said bi-stable means and positioned in accordance with the stable states thereof, one position of said bi-stable device and switching means connected thereto being designated as representing a stored binary digit "0" and the other position being designated as representing a stored binary digit "1," said bi-stable means having two energized, intermediate unstable states wherein said bi-stable means will maintain the movable contact of said switching means in the immediately previous position thereof, add-subtract switch including a common contact and a pair of contacts alternately engageable with said common, movable contact in circuit with said switching means for selectively conditioning the circuit for a subtractive or an additive operation, circuit means for energizing said bi-stable device, said circuit means having a pair of input terminals, input register means including a pair of contacts having an open and a closed position for each stage positioned in accordance with the value of a binary digit to be entered in that stage, the respective input terminals of said circuit means being under control of the pair of contacts of said register means of that particular stage and under the joint control of the position of the movable contact of said switching means, the contacts of said register means and the movable contact of said add-subtract switch of a stage assigned to a lower order.

References Cited in the file of this patent

UNITED STATES PATENTS

| | | |
|---|---|---|
| 2,318,591 | Couffignal | May 11, 1943 |
| 2,364,540 | Luhn | Dec. 5, 1944 |
| 2,404,047 | Flory | July 16, 1946 |
| 2,425,131 | Snyder | Aug. 5, 1947 |
| 2,503,765 | Rajchman | Apr. 11, 1950 |
| 2,601,281 | Hartley | June 24, 1952 |
| 2,638,267 | Hartley | May 12, 1953 |
| 2,719,670 | Jacobs et al. | Oct. 4, 1955 |
| 2,830,236 | Reynolds | Apr. 8, 1958 |

OTHER REFERENCES

"Counting With Relays," G. R. Frost, AIEE Technical Paper, May 1949.